Aug. 21, 1928.

F. B. BARSHELL 1,681,893

MOTOR VEHICLE AND STEERING DEVICE

Original Filed Feb. 1, 1923   5 Sheets-Sheet 4

INVENTOR.
Frederick B. Barshell
by Emanuel Scheyer
ATTORNEY.

Patented Aug. 21, 1928.

1,681,893

UNITED STATES PATENT OFFICE.

FREDERICK B. BARSHELL, OF NEW YORK, N. Y., ASSIGNOR OF ONE-HALF TO DAVID BARSHELL, OF NEW YORK, N. Y.

MOTOR VEHICLE AND STEERING DEVICE.

Original application filed February 1, 1923, Serial No. 616,423. Divided and this application filed September 17, 1926. Serial No. 136,116.

This is a division of my application, Serial #616,423, filed February 1, 1923, for universal motion motor propelled vehicles and auxiliary traction and steering devices.

The present invention relates to motor driven vehicles having steering and driving mechanism enabling them to be turned and moved in a variety of ways. My improved construction enables a vehicle with or without a motor to be turned about in a very small space and to be readily movable laterally. According to my invention a vehicle is provided with a pair of front wheels which can be steered in parallelism or in opposite steering directions to each other. The wheels can be made to converge or diverge from each other or to lie substantially in planes at right angles to the longitudinal axis of the vehicle. Further manually controlled means is provided in the case of motor vehicles whereby the tractive power can be applied to the wheels to cause them to both turn in the same direction or in opposite directions to each other. Another feature of my construction is the provision of means whereby when the wheels have been steered a predetermined amount they are automatically connected to the source of tractive power for driving them. This predetermined amount can be arranged to vary between any limits, so that even when the wheels have been barely steered or not steered at all, the tractive power under manual control can be caused to drive the wheels. The description and drawings relate largely to a pair of front wheels steered and driven as noted above, but without departing from the scope of the invention any one skilled in the art can apply this construction to the rear wheels instead of the front wheels or to both sets of wheels at the same time. An advantage of the latter construction is that the vehicle can be steered about an axis falling within the body of the vehicle, enabling a turn to be made in a very small space. Furthermore it permits the vehicle to be moved sidewise.

Other objects and advantages will become apparent upon a further reading of the description and drawings, in which, Figure 9 to Figure 23, both inclusive, are diagrammatic views illustrating some of the usual directional dispositions of the steering wheels of the vehicle as are operably effected by the improved steering mechanisms hereinafter referred to.

Figure 1:
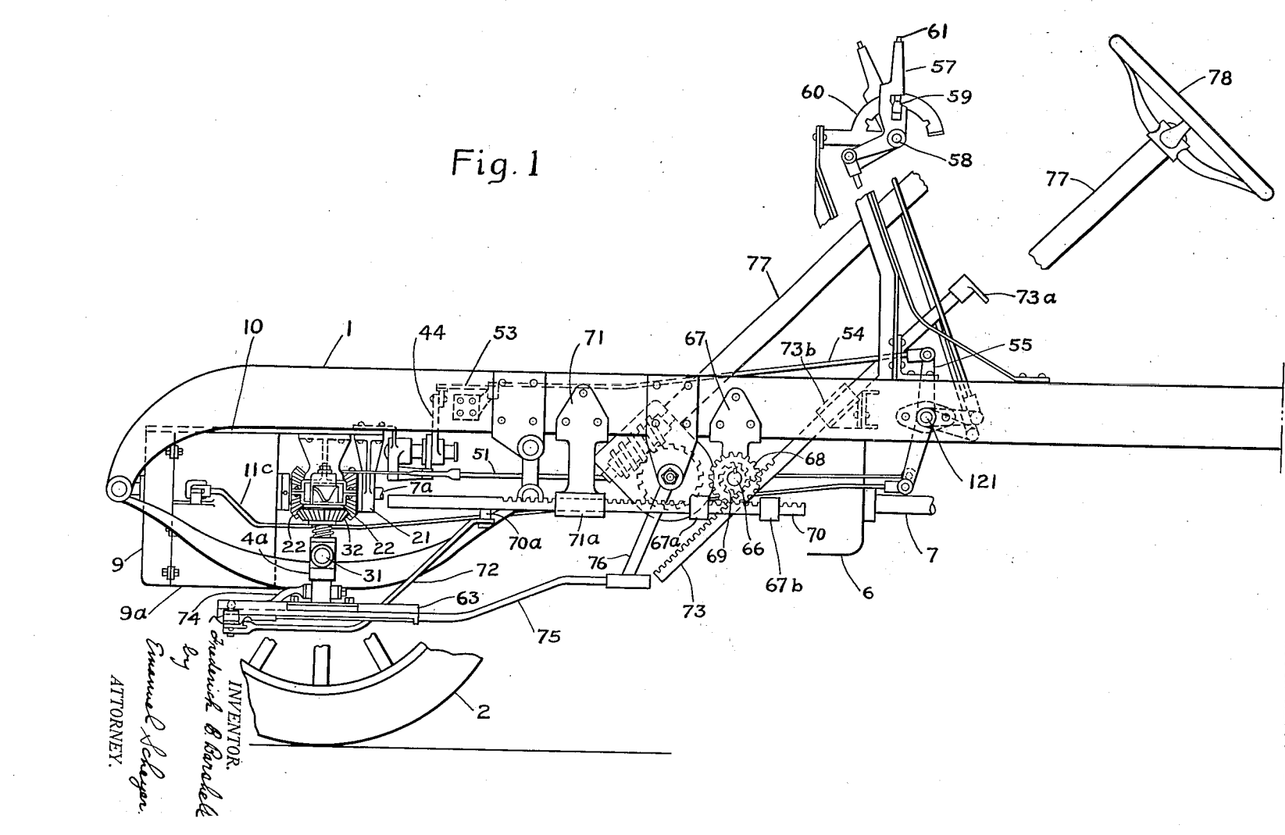
Figure 1 is a side elevation of the forward portion of a motor vehicle embodying my improvements.
Figure 2:
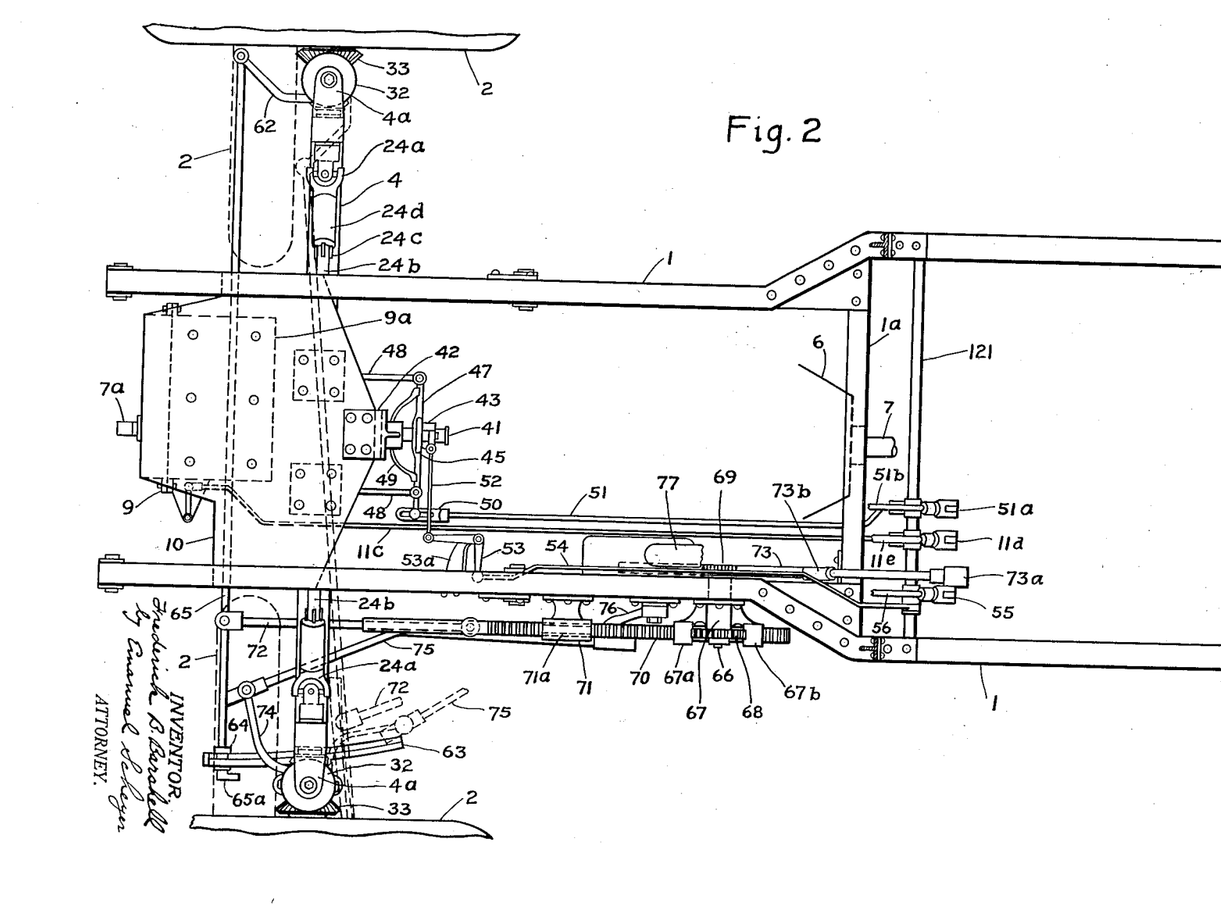
Figure 2 is a plan of the same portion partially in section and fragmentary.
Figure 3:
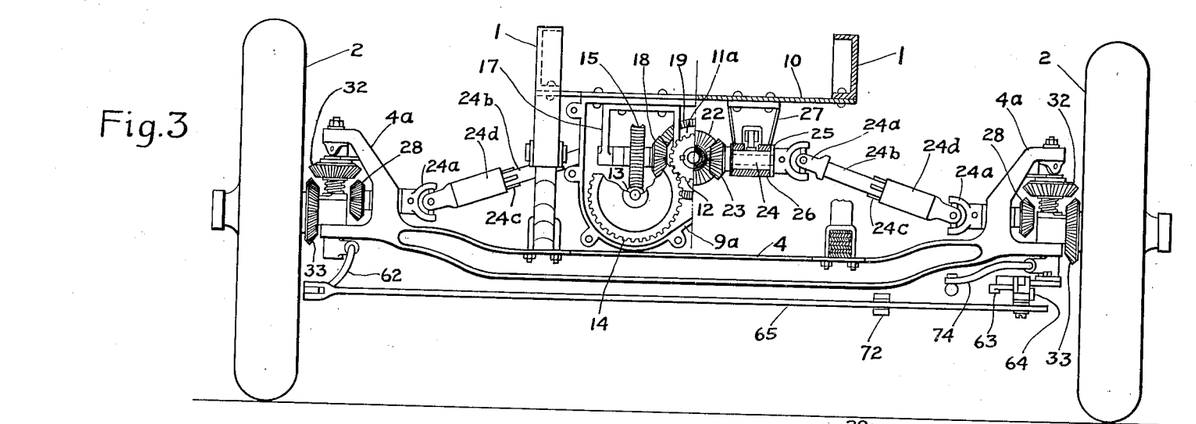
Figure 3 is a front view of the motor vehicle, fragmentary and partially in section showing the improved front wheels steering and driving mechanisms.

By referring to Figures 1, 2 and 3, which show generally a portion of my improved construction as applied to the forepart of the vehicle, it will be seen that the arrangement included in this group embodies a power transmission mechanism and a steering control mechanism for the front main wheels, making said wheels power driven steering wheels, provided with controls operable to cut out one or both front wheels from the driving connection.

Figure 4:
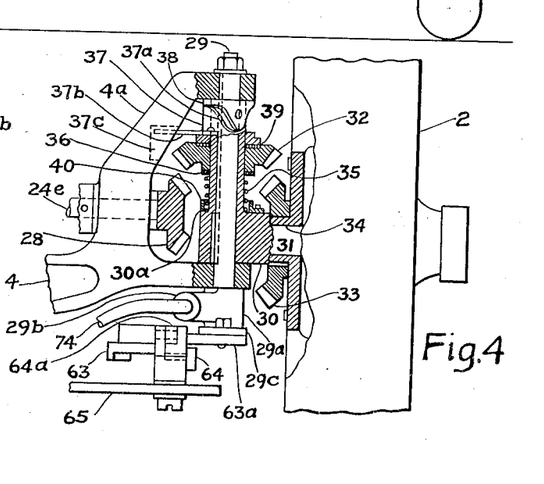
Figure 4 is an enlarged vertical sectional view of the driving mechanism of one front wheel, showing portions of the improved steering mechanism therefor.
Figure 5:
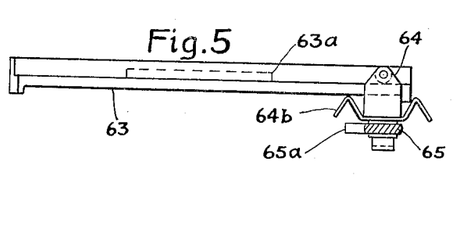
Figure 5 is an enlarged side elevation of the improved front wheel steering and reversing arm and showing the rider device.
Figure 6:
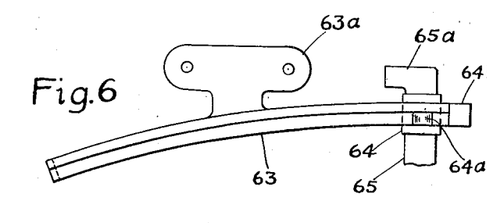
Figure 6 is a top plan view of the steering and reversing arm referred to, showing the rod connection for operating the rider device.
Figure 7:
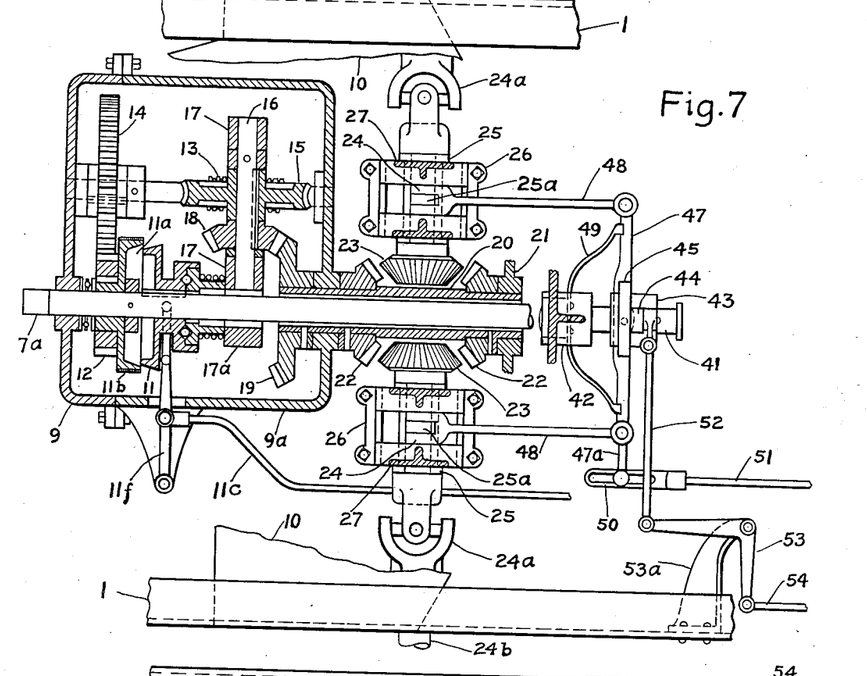
Figure 7 is a horizontal section, partly plan view of the transmission gear mechanism for the front drive wheels, the parts being adjusted for cutting out the front wheels and the operating parts thereof being shown as positioned for running loose.
Figure 8:
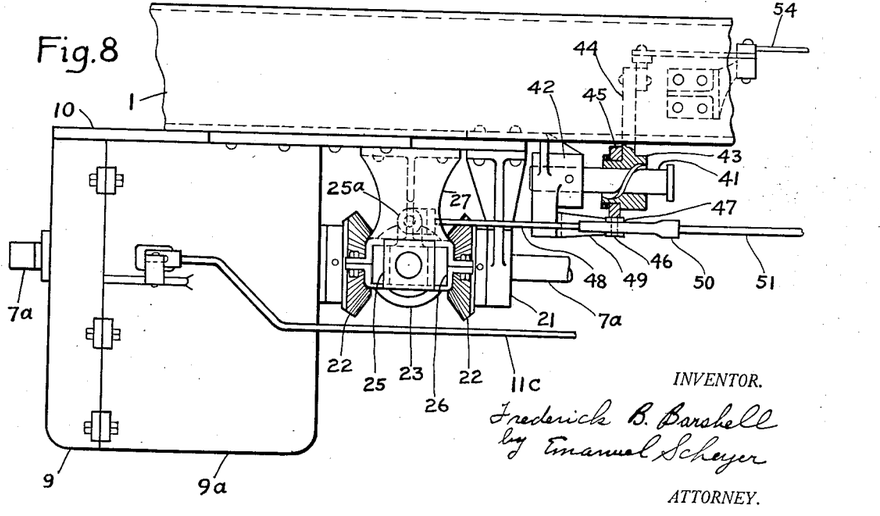
Figure 8 is a side elevation of the transmission gear mechanism referred to, partially in section and showing the housing therefor.
Figure 9:
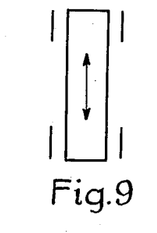
Figure 10:
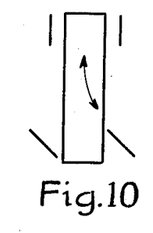
Figure 11:
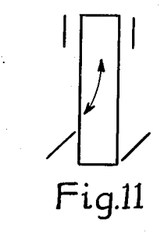
Figure 12:
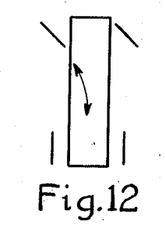
Figure 13:
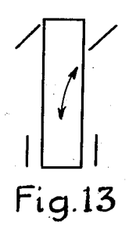
Figure 14:
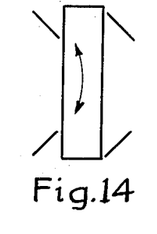
Figure 15:
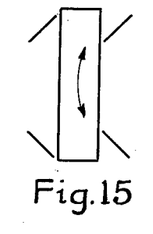
Figure 16:
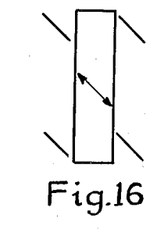
Figure 17:
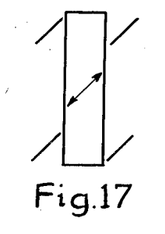
Figure 18:
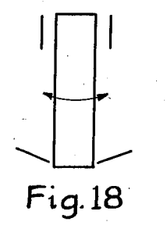

In the embodiment of my invention shown in the drawings, an automobile of the usual type is shown provided with a chassis 1 having the main front wheels 2—2 rotating on the front axle 4, said axle 4 being a stationary member suitably connected to the chassis 1. The power plant, which is secured to the chassis includes a motor or engine 6; a shaft 7 to which said power plant delivers power at the rear thereof, connects to the rear driving wheels (not shown). Referring to Figures 1, 2, 3, 4, 5, 6, 7 and 8, the power transmission mechanism and the steering gear for the main front wheels as a whole, will be made evident. The power transmission mechanism as shown in Figures 7 and 8 is mounted partly in a two part housing, the sections 9—9ª of which, are suitably supported upon and secured to a cross frame 10, which is securely fixed to the chassis 1, while at the ends of axle 4 the vertically positioned yokes 4ª, which are similar, though larger and stronger than the steering yokes in common use, accommodate the steering and driving connections. The said section 9 provides a bearing for the forward end 7ª of the motor driven or power shaft, that shaft projecting into the housing and carrying within it a clutch member 11ª rotatably mounted thereon and provided with a hub to which a gear member 12 is keyed. A coacting clutch member is shown at 11 keyed to shaft 7ª and actuated by a lever control mechanism hereinafter described, through the forked arm 11ᶠ, which at one end pivotally engages a bracket on the section 9ª and at the forked end is adapted to impart an axial movement to said clutch member 11. A manually operated clutch band mechanism 11ᵇ is adapted to coact with the rim of the clutch member 11ª, operative means for said clutch band not being shown. A hollow journal 20 rotatably mounted, journaled at one end in the section 9ª of the housing 9—9ª and at the other end in the bearing 21 securely supported on the cross frame 10, the said hollow journal being coaxial with the power-driven shaft 7ª and clearing the latter, extends part-way into the housing 9—9ª. 22—22 indicate a pair of bevel gears oppositely disposed and mounted fixedly to turn with the hollow journal 20 outside the housing 9—9ª and together designate what is hereinafter termed the multiple gear mechanism. The gears 22—22 are spaced apart to accommodate between them the movable bevel gears 23—23 arranged at each side of said hollow journal 20, the said gears 23—23 being adapted for operative engagement with either of the gears 22—22, for alternating engagement therewith or they may be set between the gears 22—22 in an inoperative position as hereinafter referred to. Positioned on the side of the shaft 7ª and journaled in the housing 9—9ª is shown a worm 13 having the gear member 14 fixedly mounted thereon, which engages and receives power from the gear member 12 keyed to the clutch. A worm gear 15 in enmeshed engagement with the worm 13 is keyed to a rotatably mounted shaft 16 journaled in the bracket 17, which is rigidly secured to the housing 9—9ª. The bracket 17 is provided with a hub 17ª at one end thereof, surrounding shaft 7ª and leaves a clearance space between it and the shaft; the coil spring of the thrust bearing of the clutch 11 abuts at one end with the hub 17ª, while the thrust bearing positioned at the other side of the clutch abuts with the housing section 9, thus eliminating any axial strain from the shaft 7ª. A bevel gear member 18 keyed to the rotatable shaft 16 is in enmeshed engagement with a bevel gear 19 fixedly mounted on and delivering power to the hollow journal 20 of the last said multiple gear mechanism. The clutch member 11, it will be seen in Figure 7, is arranged for being operated by a suitable lever control 11ᶜ actuated in any suitable way by the operator. A pair of cross, power transmission or driving shafts, extensible and rotatably mounted are positioned one at each side of the power shaft 7ª to transmit the engine power from said multiple gear mechanism to the driving mechanisms of the front main wheels 2—2, as shown in Figure 3 and Figure 4. The inner and outer ends 24 and 24ᵉ of said respective driving shafts are slidably coupled by the extension shafts 24ᵇ and the coacting sleeve 24ᵈ, which are joined to said ends respectively, by the universal joint member 24ª, the said shafts 24ᵇ being held against rotation in the sleeves 24ᵈ by a plurality of keys 24ᶜ. The inner end 24 of the respective cross shafts is journaled in a bushing 25, which is slidably mounted in a bearing 26 rigidly supported by the bracket 27 upon the cross frame 10. The outer end 24ᵉ of the said cross shafts is journaled upon a substantially fixed axis in the respective yokes 4ª at the ends of the axle 4. 23 and 28 designate bevel gears fixedly mounted to the shaft ends 24 and 24ᵉ of the respective cross shafts. The gears 23—23, when operably moved by a lever control mechanism hereinafter explained, with the slidable bushings 25—25, are guided in their paths by the respective bearings 26—26 between the gears 22—22 to which the bevel gears 23 are adapted for engagement. Thus the pair of cross driving shafts are adapted to operate at their respective inner ends at levels varying with those of the outer ends. The yokes 4ª—4ª are provided at their ends respectively with openings in which are journaled spindles 29, one in each yoke upon a vertical axis and these together with the yokes 4ª—4ª accommodate the steering and driving mechanisms for the front main wheels 2—2. Fixedly mouned on the respective spindles 29 and bearing against the upper and lower arms of the yokes 4ª is the sleeve 30 provided with a projecting stub axle 31 supporting the front main wheel 2. 32 designates a bevel gear rotatably mounted and slidable on each sleeve 30. Said slidable gear 32 interposes between the driving gear 28 fixed at the outer end 24ᵉ of the power driven shaft and the bevel gear 33 keyed to the inner end of the hub 34 of wheel 2 and is adapted to be brought into engagement with the bevel gears 28 and 33 at each yoke by operable means, which will hereinafter be explained. A spring 35 is mounted on each sleeve 30 abutting at one end on a shoulder 30$^a$ and at the other end abuts with the hub of bevel gear 32 through the medium of the antifriction device 36; said spring 35, when expanded, holds the bevel gear 32 out of mesh in an inoperative position. In order to bring the bevel gear 32 into operative engagement the said gear is movably brought into mesh with gears 28 and 33 against the expansive force of the spring 35, said spring, when compressed, being of such strength that, when permitted to expand, will overcome the frictional resistance incident to the sliding tooth faces of the gears in contact and will bring said gear 32 clear out of contact into an inoperative position. By now referring particularly to Figure 3 and Figure 4 it will be seen that the specific construction of lever connections shown for actuating the slidable bevel gears 32—32, is arranged to coact with the controls operable for my improved steering mechanism for the front main wheels 2—2. Integrally connected with each of the spindles 29—29 at the lower end and outside the yoke 4$^a$, is the head 29$^a$ provided with the hub 29$^b$, said head 29$^a$ being arranged to bear against the lower arm of the yoke 4$^a$. The sleeve cams 37—37 loosely mounted and slidable on the sleeves 30—30, have an anti-friction contact face 37$^a$ for coacting with the like shape cam members 38—38 fixedly mounted to rotate with the spindles 29—29. The sleeve cams 37—37 are constrained against rotation by the projecting arms 37$^b$—37$^b$, which move in the guides 37$^c$—37$^c$ in the yokes 4$^a$—4$^a$ parallel with the respective axes of the sleeves 37—37 and abut with the respective hubs of the slidable gears 32—32 on the side thereof opposite to said springs 35—35 and are movably supported thereby through the medium of the antifriction devices 39—39. The separator sleeves 40—40 secured to the shoulders 30$^a$ of sleeves 30—30 insure proper spacing of the interposing gears 32—32 with the respective engaging gears 28 and 33. Thus, when a turning movement is imparted to the spindles 29—29 in a manner, which will hereinafter be explained, the interposing bevel gears 32—32 are moved axially along the respective sleeves 30—30 into or from engagement of the coacting gears 28 and 33. As hereinbefore stated, the construction I have shown for actuating the interposing gear members 32—32, shows them to be thrown into or out of action automatically upon the turning movement of the wheels 2—2 by the steering controls and this aspect of its practical application is illustrated in the angular disposition of the wheels of a moving vehicle shown diagrammatically in Figure 9 to Figure 23 both inclusive. It is obvious that the lever connections for controlling the axial movement and for operably actuating said gear members 32—32 on the respective sleeves 30—30, may be made independent of the steering controls. To protect the driving mechanism of the front main wheels from dirt a suitable enclosure or housing may be provided for the same.

In order to bring the gears 23—23 into operative engagement with the multiple gear mechanism or to bring the same from engagement thereof, there is provided as shown in Figure 7 and Figure 8 a shaft 41 mounted parallel with and vertically over the power driven shaft 7$^a$ and secured at one end by a bracket 42 to cross frame 10, the said shaft 41 being provided with a helical thread and a flange at the rear end thereof. A nut member 43 provided with a lever arm 44 is in enmeshed engagement with said helical thread and is adapted to oscillate to one side or the other side about the axis of shaft 41, whereby the nut member 43 may be axially moved along shaft 41 toward one end thereof or the other end. An annulus 45 loosely mounted in an annular groove on the nut member 43 and movably supported thereby carries a pin 46 polarity arranged and depending therefrom. A pair of rods 48—48 arranged longitudinally connect pivotally at one end by the lugs 25$^a$—25$^a$ to the respective bushings 25—25 and engage pivotally at the other end to a cross arm 47, which is pivotally mounted upon the pin 46 on the annulus 45, said cross arm 47 being yieldably constrained in a transverse position by a spring 49 secured centrally on the bracket 42. Pin 46 connects with cross arm 47 at a point midway between rods 48. Connecting rod 51 is shown provided with a slotted member 50 which permits nut member 43 through the medium of cross arm 47 to actuate bushings 25—25 simultaneously in one direction or in the opposite direction when the rod 52 imparts an oscillating movement to the lever arm 44 of nut member 43, while, when the nut member 43 is stationary, connecting rod 51 is adapted to actuate cross arm 47 by one end 47$^a$ extended, to swing about the pin 46 against the force of the spring 49 to actuate bushings 25—25 in alternate directions. By reference to Figure 1 and Figure 2 it will be seen that the control mechanism for bushings 25—25 hereinbefore described, is arranged for being operated by the respective bell crank lever control parts—rod 52, bell crank 53 mounted on a suitable bracket 53$^a$, connecting rod 54, bell crank 55 mounted on a counter shaft 121, control rod 56 and the lever control parts—connecting rod 51, bell crank 51$^a$ mounted on the counter shaft 121, control rod 51$^b$, both control rods 56 and 51$^b$ leading to levers of the type 57 capable of being oscillated on the shaft 58; each of said levers carries a pawl 59 cooperating with a notched sector 60, which is fixedly mounted to the vehicle, the pawls 59 being adapted to be moved from engagement of the said sectors 60 through the medium of the spring control 61 at the handle mounted upon the lever 57. It will now be understood that the multiple gear mechanism receives its power from shaft 7ª through the medium of the transmission mechanism comprising the clutch members 11 and 11ª, gear members 12 and 14, worm 13, worm gear 15 and gear members 18 and 19 on the shaft 16 and hollow journal 20 respectively, the clutch members being provided with the lever control parts including the connecting rod 11ᶜ pivotally engaging the shifter arm 11ᶠ, bell crank 11ᵈ mounted on the counter shaft 121 and control rod 11ᵉ leading to a manually operated lever of the type 57 and similarly mounted, the said lever control mechanism serving to cut out the said multiple gear mechanism from the power driven shaft 7ª. It will also be clearly seen, that the multiple gear mechanism in turn delivers power to the driving mechanisms of the front main wheels equipped with the respective movable gear members 32—32 through the medium of the shiftable gears 23—23, the power transmission mechanism including the shafts 24—24 each coupled slidably with the respective shafts 24ᶜ by the extension shaft 24ᵇ and the coacting sleeve 24ᵈ, which are joined respectively to said shafts by the universal joint members 24ª; the said gears 23—23 being operably actuated with the bushings 25—25 between members 22—22 by the respective lever control parts—rod 52, bell crank 53 mounted on the bracket 53ª, connecting rod 54, bell crank 55 mounted on the counter shaft 121, control rod 56 and the control parts—connecting rod 51, bell crank 51ª mounted on the counter shaft 121, control rod 51ᵇ, both control rods 56 and 51ᵇ leading to levers of the type 57 and acting through the medium of the nut member 43, the cross arm 47 and the pair of rods 48—48, whereby either of the gears 23—23 is moved into engagement with one gear 22 or the other gear 22, the gears 23—23 are moved into engagement with one gear 22, with the other gear 22, moved between said gears 22—22 in a position that renders them inoperative with both gears 22—22, or to move the same in alternate directions, whereby one gear 23 is brought into engagement with one of the gears 22 and the other gear 23, into engagement with the other gear 22. With the setting of the alternating gear members 23—23 relative to those of the multiple gear mechanism, as hereinbefore pointed out, rotation may therefore be imparted to the front main wheels, 2—2 in one direction, in the opposite direction or in alternate directions according as the wheels are angularly disposed; or the wheels 2—2 may be permitted to run loose or held against rotating by the manually operated clutch band mechanism 11ᵇ, or one wheel 2 may be driven and the other permitted to run loose.

Secured to the hub 29ᵇ of one of the spindles 29 is the steering arm 62 and secured to the lug 29ᶜ at the lower end of the other spindle 29 is another arm 63 hereinafter referred to as a steering and reversing arm. Said steering and reversing arm, which is provided with the lug 63ª by which said steering arm 63 is rigidly secured to lug 29ᶜ of the respective steering spindle, is secured and arranged so that the concave side of same, faces the other steering arm 62. A cross rod 65 connecting pivotally at one end to the projecting end of arm 62 and at the other end pivotally to a rider device 64 adapted to be operably shifted along said steering and reversing arm 63, serves to impart a joint sidewise movement to steering arms 62 and 63, the said cross rod 65 being provided with a bend 65ª at the end adjacent the rider device 64 to constrain the spring 64ᵇ hereinafter referred to, to hold the rider device 64 to the end of the steering or reversing arm 63. The rider device 64, which is provided with the roller 64ª movably supports its respective end of cross rod 65 for adjusting same for steering operation and is slidably mounted on said arm 63 in a track having a curvature adapted for the angular displacement of cross rod 65 from its normal position about the projecting end of arm 62, when the front main wheels 2—2 are positioned as shown in Figure 2 and Figure 3. The track or guide on said arm 63 extends substantially as far to one side as to the other side of a line that is normal to the curved track and that passes through the pivotal axis of the respective steering spindle 29, and, for a normal position of the wheels 2—2 with the same set parallel and directed forward as in Figure 2, a normal adjustment of cross rod 65 sets the axes of pivotal connection thereof on the same side of a straight line joining the axes about which wheels 2—2 respectively turn and make the relative position of the pivotal axis at one end of cross rod 65 to the pivotal axis about which the steering wheel at that side swings, the same as the relative position of the corresponding two axes at the oppositely disposed wheel. A catch mechanism comprising a spring 64ᵇ is secured to the rider device 64 for constraining said device to the arm 63 against displacement at the shouldered ends thereof, when said rider 64 is positioned at either end of the track. It should be stated at this point that a suitable mechanism may be used for locking said rider device 64 to either end of its track through the medium of the operating control rod 72, which engages rod 65. In order that cross rod 65 may be angularly actuated along arm 63 about the end of arm 62, there is provided a shaft 66 journaled in the bracket 67, which has bearings 67ª and 67ᵇ and which is rigidly secured to the side of chassis 1. Of a pair of gear members 68 and 69, both fixedly mounted on shaft 66, one gear 68 is in enmeshed engagement with a rack 70 which is slidably mounted in the bearings 67ª and 67ᵇ and also in another bracket 71 fixed to that side of the chassis, said rack 70 being adapted to be moved forwardly or rearwardly. A rack 73 adapted to be actuated by hand or foot at 73ª and in enmeshed engagement with the gear member 69 is slidably mounted in bracket 73ᵇ, which is fixed to a cross beam 1ª of the chassis. An intermediate rod 72 connects pivotally at one end to cross rod 65 and at the other end pivotally by the pin 70ª to rack 70, the said bracket 71 being slotted on the under side at 71ª to accommodate the passage of said pin 70ª during the operation of rack 70. It will now be understood that the cross rod 65 may be actuated along the steering or reversing arm 63 in one direction or in the opposite direction by the reciprocable control rack 73 through the medium of gear members 69 and 68, rack 70 and rod 72, whereby the steering arms 62 and 63 may be arranged to impart a sidewise turning movement to wheels 2—2 in unison to position them in a direction parallel to each other or in directions at any angle to each other convergent or divergent and, that the rod 72 is adapted to oscillate and move with the cross rod 65 as the sidewise movement of the wheels 2—2 may demand. Connected pivotally to the projecting end of the lever arm 74 attached to the steering spindle 29, is the rod 75 through which angular movement is imparted to the lever arm 74 in one direction or in the opposite direction by the manually operated steering wheel 78 through the medium of the steering post mechanism 77 and the steering lever arm 76, whereby to impart a sidewise turning movement to the front main wheels 2—2 in unison at any angle in one direction, in unison in the opposite direction or to turn one of said wheels 2 sidewise at any angle in one direction, the other wheel 2 turning in unison in the reverse direction. The form of construction comprising the rod 75, the steering post mechanism 77 and steering lever arm 76 together with the steering wheel 78 is of the usual type in automobiles to serve as a portion of the steering mechanism for the front main wheels and needs no further description as it constitutes no part of my present invention in itself.

As indicated in Figures 1, 2 and 3, the hereinbefore described driving and steering mechanism is, in the present embodiment of my invention embodied on the forepart of the chassis; the same idea may of course be embodied on the rear end of the chassis as well as on the forward end thereof as indicated diagrammatically in Figures 9 to 23, but inasmuch as such a construction would be very similar to the one already shown and described, the foregoing description will suffice to make this application clear.

The different adjustments for the operation of the transmission and steering mechanisms for the front main wheels 2—2 are substantially as follows:—

As was previously explained, the control mechanism for bringing the sliding gears 32—32 of the front wheel-drives into operative engagement with the transmission mechanism, is operable through the steering control by the cam member 38, as shown best in Figure 4, adapting this shifter mechanism to become effective for such angular positions of the front wheels 2—2, as may be selected. And it is obvious that the sliding gear members 32—32 and therefore the wheels 2—2 will receive the engine power for larger or smaller angular changes of these steering wheels according as the cam members 37 are shaped. Thus, when the sliding gears 32—32 are in operative engagement, the manner of operating the front main wheels 2—2 is substantially as follows:—

*Drive forward.*—By the operator's hand lever connecting to the arm 11ᶠ the clutch 11 is applied to the coacting clutch member 11ª, the brake band 11ᵇ being out of operative engagement; the cross arm 47 is actuated by the hand lever through rod 51, thereby enmeshing the right hand side gear 23 with the forward gear 22 and the left hand gear 23 with the rearward gear 22 from the position shown in Figure 7. When thus adjusted, the power from the engine shaft drives the transmission mechanism in the casing 9—9ª, the multiple gear mechanism, the transverse power shafts and the front wheel-drives, driving the vehicle in the direction of the lower arrow head indicated in the diagram Figure 9. It is understood that by the reversal of the cross arm 47, reversing the positions of the gears 23—23, a drive backward is provided for.

*A right hand turn, wheels converging forward.*—From the position shown in Figure 2, the left end of the cross steering rod 65 is moved along the reversing arm 63 to the rear end thereof by the handle 73ª of the control rack 73. By turning the hand wheel 78, the lever arm 74 is turned rearward thus converging the front wheels 2—2 forward to a position like that indicated in the diagram Figure 18. The front wheels can be turned to such convergence that their axes will intersect the rear axle of the vehicle at a point midway between the rear wheels. Under this condition all the wheels can be made to rotate about a vertical axis through said midway point. By the hand lever connecting to the arm 11ᶠ, clutch 11 is applied to the coacting clutch member 11ª, the brake band 11ᵇ being out of operative engagement; from the position shown in Figure 7 the cross arm 47 is actuated axially along the shaft 41 by the nut member 43 through the rod 52, thereby enmeshing both gear members 23 with the rearward gear member 22. When thus adjusted, the power from the engine shaft drives the transmission mechanism in the casing 9—9ª, the multiple gear mechanism, the transverse power shafts and the front wheel-drives, driving the vehicle in the direction of the left arrow head indicated in the diagram Figure 18. By actuating the cross arm 47 axially on shaft 41 in the reverse direction, thereby enmeshing the gear members 23—23 with the forward gear member 22, a left hand turn is provided for.

Figure 19:
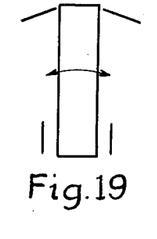
Figure 20:
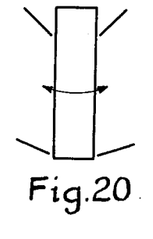
Figure 21:
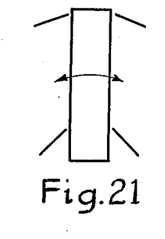
Figure 22:
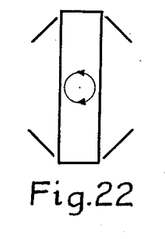
Figure 23:
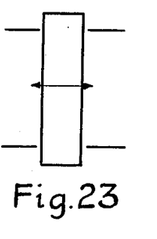

*A right hand turn, the front wheels adjusted to drive in alternate directions.*—By adjusting the driving transmission mechanism as just described and the wheels 2—2 directed forward, the provision is made for driving said wheels in alternate directions, whereby a right hand turn or left hand turn may be imparted to the motor vehicle, when the rear part of the vehicle rests on a pair of wheels with mechanism similar to those used in the front and said rear wheels are arranged to converge backward in a position like that indicated in the diagram Figure 19, wherein all wheels are arranged to rotate about the same axis.

*A right hand turn, one front wheel having a driving connection and one front wheel running loose.*—By the operator's hand lever connecting to the arm 11ᶠ, the clutch 11 is applied to the coacting clutch member 11ª, the brake band 11ᵇ being out of operative engagement; from the position shown in Figure 7 and actuated by the cross arm 47 either through the rod 51 or the rod 52, the right hand side gear member 23 is enmeshed with the forward gear member 22 and driving the wheel 2 at that side—the wheel 2 at the opposite side running loose, it being cut out by the action of the cam 37; or, the left hand side gear member 23 is enmeshed with the rearward gear member 22 and driving the wheel 2 at that side—the wheel 2 at the opposite side running loose, it being cut out by the action of the cam 37. By turning the hand wheel 78, the wheels 2—2 may be turned in unison through the transverse movement of the cross rod 65, the latter being positioned at the forward end of the reversing arm 63. When thus adjusted, the power from the engine shaft drives either wheel 2 as selected, through the transmission mechanism previously described. By a reversal of said parts, a left hand turn is provided for, see the diagrams Figures 10 and 11.

When the engine is to run loose, the clutch 11 is brought out of operative engagement or the movable gear members 23—23 may be brought out of operative engagement or both the former and the latter are out of operative engagement, see Figure 7.

By combining the use of a pair of dirigible rear wheels similar to those used in the front, movements may be imparted to the motor vehicle permitting it to travel forward, backward or sidewise at any angle in either direction, to turn in any direction or to rotate pivotally in either direction, the said movements being made directly from a state of rest, as indicated in the diagrams Figures 9 to 23 both inclusive.

Having thus described my invention and explained its manner of construction and use, what I claim is:—

1. A motor vehicle having dirigible front wheels, a steering arm for one of said wheels, extending in one direction from its steering axis, a steering arm for the other of said wheels extending from the steering axis of said second wheel in substantially the same direction as said first crank arm, said second steering arm also extending in substantially the opposite direction from the steering axis of the second wheel, and a cross member adapted to connect the first steering arm with the second steering arm as desired, either with the extension of said second steering arm in the same direction as said first arm or with the extension of said second arm in the opposite direction, whereby said wheels may be steered in parallelism or in opposite directions to each other.

2. A motor vehicle as claimed in claim 1 in which the cross member at one end is pivotally mounted near the end of said first steering arm and at its other end is adjustably mounted upon the second steering arm whereby it can be set near either end of said second steering arm.

3. A motor vehicle as claimed in claim 1 having manually operable means for changing the location of the end of the cross member from substantially one end to the other of the second steering arm.

4. A motor vehicle having dirigible front wheels, a steering arm for one of said wheels, extending in one direction from its steering axis, a steering arm for the other of said wheels extending from the steering axis of said second wheel in substantially the same direction as said first steering arm, said second steering arm also extending in substantially the opposite direction from the steering axis of the second wheel, and a cross member adapted to connect the first steering arm with the second steering arm as desired, either with the extension of said second steering arm in the same direction as said first arm or with the extension of said second arm in the opposite direction, said second steering arm being arcuate in form with a radius of curvature substantially equal to the working length of the cross member.

5. A motor vehicle having a pair of front steering yokes, steering spindles rotatably mounted in said yokes, a wheel carried by each spindle, power driven means extending substantially to each of said wheels, cam means slidably mounted upon each of said spindles but fixed against rotation therewith, corresponding cam means fixed to each spindle adapted to engage with said first cam means, the rotation of said spindle cam means adapted to cause said first cam means to be slid along said spindle, means in engagement with said first cam means, adapted when said first cam means are in a predetermined position on the spindle, to cause the engagement of said power driven means with said wheels for supplying tractive power to said wheels, whereby when said wheels have been steered a predetermined amount, tractive power is automatically supplied to them.

6. A motor vehicle having a pair of dirigible wheels, a mounting for each of said wheels pivotally supported upon the frame of the vehicle about a substantially vertical steering axis effecting said dirigibility, a member pivotally connected to one of said mountings, the pivotal connection being in a substantially fixed position upon said mounting, said member being also pivotally connected to the other mounting, said latter pivotal connection being movable from one portion of said other mounting to another portion on substantially the opposite side of its steering axis, and manually operable means connected to one of said mountings for rotating same about its steering axis.

7. A motor vehicle having a pair of dirigible wheels, a mounting for each of said wheels pivotally supported upon the frame of the vehicle about a substantially vertical steering axis effecting said dirigibility, a member pivotally connected to each of said mountings, the pivotal connection to one of said mountings being shiftable from one portion of said latter mounting to another portion on substantially the opposite side of its steering axis.

8. A motor vehicle having a pair of dirigible wheels, a mounting for each of said wheels pivotally supported upon the frame of the vehicle about a substantially vertical steering axis effecting said dirigibility, a member pivotally connected to each of said mountings, the pivotal connection to one of said mountings being in substantially fixed position upon said mounting, while the pivotal connection to the other of said mountings is shiftable from one side of the steering axis of said latter mounting to the other, whereby said wheels may be steered simultaneously in parallel directions or in opposite steering directions to each other, and a second member connected to said first member for swinging said first member about its fixed pivotal connection.

9. A motor vehicle having a pair of dirigible wheels at an end, a mounting for each of said wheels pivotally supported upon the frame of the vehicle about a substantially vertical steering axis effecting said dirigibility, a cross member pivotally connected to each of said mountings, the pivotal connection to one of said mountings being in substantially fixed position upon said mounting at a substantial distance from its vertical axis, while the pivotal connection to the other of said mountings is shiftable from one side of the steering axis of said latter mounting to the other, whereby said wheels may be steered simultaneously in parallel directions or in opposite steering directions to each other, a manually operated shifting device having a portion movable longitudinally of the vehicle in fixed guides, and a connecting member pivoted at one end to said cross member and at the other to said portion, for transmitting the longitudinal motion of said portion to said cross member for swinging the latter about its fixed pivotal connection.

10. A motor vehicle having a pair of dirigible wheels, a mounting for each of said wheels pivotally supported upon the frame of the vehicle about a substantially vertical axis effecting said dirigibility, a member pivotally connected to each of said mountings, the pivotal connection to one of said mountings being shiftable from a position on one side of the steering axis of said latter mounting to another position on the other side of said axis, whereby said wheels may be steered simultaneously in parallel directions or in opposite steering directions to each other, means for automatically locking said latter pivotal connection in said positions, and manually operable means for shifting said latter connection into said positions.

11. A motor vehicle having a substantially fixed axle, a spindle rotatably mounted near each end of said axle with its longitudinal axis substantially vertical, a sleeve fixedly mounted upon said spindle, a stub axle projecting from said sleeve, a wheel of the vehicle rotatably mounted upon said sleeve, a gear wheel loosely and slidably mounted upon said sleeve, steering mechanism for rotating said spindle, a power driven shaft adapted to engage with said gear wheel, said vehicle wheel also having a portion adapted for engagement with said gear wheel, cam mechanism, rotatable in fixed relation to said spindle, causing said gear wheel to slide along the sleeve into engagement with the shaft and said portion of the vehicle wheel when said spindle has been steered a predetermined amount, for transmitting the power from said shaft to the vehicle wheel.

12. A motor vehicle having a pair of dirigible wheels, a mounting for each of said wheels pivotally supported upon the frame of the vehicle about a substantially vertical steering axis effecting said dirigibility, a member pivotally connected to one of said mountings at one side of its steering axis, a gude provided for the other of said mountings extending from the same corresponding side of its steering axis as for the former mounting, to the opposite side of said axis, a connecting device for pivotally connecting said member to said second mounting, said connecting device being shiftable along said guide, and means for shifting said connecting device into a plurality of positions along said guide.

Signed at New York, in the county of New York and State of New York, this 16th day of Sept. A. D. 1926.

FREDERICK B. BARSHELL.